United States Patent

Kesselring

[19]

[11] Patent Number: 6,081,299
[45] Date of Patent: Jun. 27, 2000

[54] METHODS AND SYSTEMS FOR ENCODING REAL TIME MULTIMEDIA DATA

[75] Inventor: William David Kesselring, San Jose, Calif.

[73] Assignee: International Business Machines Corporation, Armonk, N.Y.

[21] Appl. No.: 09/026,492

[22] Filed: Feb. 20, 1998

[51] Int. Cl.[7] .................................................. H04N 9/475
[52] U.S. Cl. ......................... 348/512; 348/513; 348/845; 348/845.1; 348/845.2; 348/845.3; 375/354
[58] Field of Search .................................. 348/512, 513, 348/518, 845, 845.1, 845.2, 845.3, 423; 382/232; 386/68, 81, 82, 111, 112; 375/354, 371; 364/514 R; 345/302

[56] References Cited

U.S. PATENT DOCUMENTS

| | | | |
|---|---|---|---|
| 5,381,181 | 1/1995 | Deiss | 348/423 |
| 5,430,485 | 7/1995 | Lankford et al. | 348/423 |
| 5,467,137 | 11/1995 | Zdepski | 348/423 |
| 5,469,466 | 11/1995 | Chu | 375/354 |
| 5,486,864 | 1/1996 | Zdepski | 348/423 |
| 5,533,021 | 7/1996 | Branstad et al. | 370/396 |
| 5,559,999 | 9/1996 | Maturi et al. | 395/550 |
| 5,565,923 | 10/1996 | Zdepski | 348/423 |
| 5,566,174 | 10/1996 | Sato | 370/84 |
| 5,594,660 | 1/1997 | Sung et al. | 395/806 |
| 5,598,352 | 1/1997 | Rosenau et al. | 364/514 A |
| 5,598,415 | 1/1997 | Nuber et al. | 370/474 |
| 5,600,379 | 2/1997 | Wagner | 348/497 |
| 5,617,502 | 4/1997 | Ort et al. | 386/97 |
| 5,652,627 | 7/1997 | Allen | 348/497 |
| 5,682,384 | 10/1997 | Zarros | 370/394 |
| 5,703,877 | 12/1997 | Nuber | 348/423 |
| 5,742,647 | 4/1998 | Chaisemartin | 375/366 |
| 5,751,721 | 5/1998 | Bloks | 370/509 |
| 5,771,075 | 6/1998 | Rim | 348/845.3 |
| 5,790,543 | 8/1998 | Cloutier | 348/423 |
| 5,805,602 | 9/1998 | Cloutier et al. | 370/516 |

FOREIGN PATENT DOCUMENTS 0 719 053 A2  6/1996  European Pat. Off. ......... H04N 7/52

OTHER PUBLICATIONS

Design Architecture for MPEG2 Transport Demultiplexor Assist, *IBM Technical Disclosure Bulletin*, vol. 39, No. 4, pp. 283–286 (Apr. 1996).

*Primary Examiner*—Mark R. Powell
*Assistant Examiner*—Wesner Sajous
*Attorney, Agent, or Firm*—Robert N. Crouse; John D. Flynn

[57] ABSTRACT

Methods and systems are provided for generating a real time multimedia data stream with accurate time stamps for decoding. Time stamps are provided which compensate for a difference between a video frame rate corresponding to a video frame within the real time multimedia data stream and the oscillator clock. The video frame is then stamped with the time stamp which compensates for the difference between the theoretical presentation time stamp corresponding to the video frame and the oscillator clock.

37 Claims, 9 Drawing Sheets

Fast Video Frame Rate

Slow Video Frame Rate

METHODS AND SYSTEMS FOR ENCODING REAL TIME MULTIMEDIA DATA

FIELD OF THE INVENTION

The present invention relates to the field of multimedia systems. More particularly, the invention relates to the encoding of video and audio data.

BACKGROUND OF THE INVENTION

Audio and video data has been used to supplement the capabilities of many known systems. For example, video data has been used to supplement the capability of the telephone to produce a multimedia system which may be referred to as a teleconferencing system. The teleconferencing system provides video data to supplement the audio data. The inclusion of video data in a multimedia system, however, may increase the likelihood of data bandwidth problems. Specifically, the size of the audio and video data may make it difficult for the system to transmit all of the required data in the necessary time. Consequently, some multimedia systems utilize a form of encoding and decoding of the audio and video data to reduce the required bandwidth. Several multimedia specification committees have established and proposed standards for encoding and decoding audio and video information. MPEG1 and MPEG2 (the MPEG standard), established by the Motion Picture Experts Group, are examples of such standards.

A system using the MPEG standard may compress real time audio and video data for transmission over a network where the audio and video may be decompressed and reproduced. The system may compress each video frame to reduce the amount of data required to reproduce the equivalent frame for display. Video frames may be compressed in three ways according to the MPEG standards. An intra or I-type frame may comprise a frame of video data coded using information about itself. One given non-compressed video frame may be encoded into one I-type frame of encoded video data. A predictive or P-type frame may comprise a frame of video data encoded using motion compensated prediction from a past frame. A previously encoded frame such as I-type or P-type may be used to encode a current non-compressed frame of video data into a P-type frame of encoded video data. A bi-directional or B-type frame may comprise a frame of video data encoded using a motion compensated prediction from a past and future reference frame, or a past, or a future reference frame of video data. A reference frame may be either an I-type frame or a P-type frame. If a reference frame were to be lost or discarded, the decoder may slow down when decompressing subsequent video frames which were compressed with reference to the discarded frame.

FIG. 1A is a block diagram of a realtime multimedia system using encoding and decoding. The encoder 100 may accept analog audio and video information to produce a multimedia data stream which may be transmitted across a connection 120. The decoder 150 may then decode the multimedia data stream for presentation to the end user.

The analog audio and video information may be processed by encoder 100 using video encoder 105 and audio encoder 110. The video encoder 105 and the audio encoder 110 compress the video and audio information according to the MPEG1 or MPEG2 standard. A specified frame rate may be used to predict the arrival time of each video frame from the real time video source. For example, if the specified frame were 30 frames per second, a prediction may be made that a video frame will arrive approximately every 33 ms. An arriving video frame may then be stamped with the time which corresponds to the predicted arrival time for the that frame. The time stamp may be associated with the encoded video information (a video presentation time stamp or VPTS) and the audio information (an audio presentation time stamp).

More data may be required to display an image than to generate accompanying audio as an image may have varying resolutions and include motion and frame rates not included in the audio data. Thus, video data may occur more frequently within the MPEG data stream. The infrequent interspersion of audio data between video data may cause an image frame to be displayed before or after the audio has been reproduced. The time stamps may be used to synchronize the presentation of audio and video at the decoder 150.

In general, the audio and video data may be synchronized by the decoder 150 by comparing the audio and video presentation time stamps with the system clock reference (SCR) 125. The SCR 125 may indicate how much time has elapsed since the start of the multimedia data stream. Ideally, the time stamps within the multimedia data stream correspond to the SCR 125. By comparing the SCR 125 with the presentation time stamps associated with audio and video data, the decoder 150 may determine whether the video and audio data are leading or lagging SCR 125. The decoder 150 may then compensate for the lead or lag. For example, if the decoder 150 determines that the presentation time stamps are lagging the SCR 125, the decoder 150 may discard the data associated with the lagging presentation time stamps.

FIG. 1B illustrates an exemplary arrangement of video frames, corresponding SCR times and the presentation time stamps associated with the video frames. SCR times 33 ms through 166 ms correspond to the arrival times for video frames provided at a particular theoretical frame rate. Frame numbers #1 through #5 correspond to the encoding time of video frames provided by the real time video source. PTS times 33 ms through 166 ms indicate the time stamp on the corresponding video frame. For example, video frame #2 is encoded at SCR time 66 ms and is stamped with a PTS of 66 ms.

As multimedia systems proliferate consumer electronic devices may be used to supply audio and video input. For example, a multimedia system may include a video cassette recorder (VCR) to supply realtime video input. The encoder 100 could then use the frame rate specified in the MPEG header to time stamp the associated video and audio data. There may, however, be problems associated with the use of various consumer electronic devices. For example, some consumer electronic devices may produce video frames at a rate which is not in accord with the specified rate. Similarly, the video output provided by the consumer electronic device may not be in accord with known standards associated with video signals. In other words, the specified video frame rate may be inaccurate, causing video frames to be stamped inaccurately. Moreover, many consumer electronic devices may produce a comparatively low quality video output. For example, some spurious signals may occur in the video supplied by the consumer electronic device which may lead to an inaccurate frame rate.

FIGS. 2 and 3 illustrate how video frames may be stamped with inaccurate time stamps when the specified frame rate is incorrect. FIG. 2 illustrates the time stamps associated with encoded video frames when a real time video source provides video frames faster than the specified rate. A faster than specified frame rate may cause video frames to be time stamped with times which do not correspond to SCR 125. For example, frame #1 is encoded and stamped with a PTS of 33 ms. Frame #2, which according to the specified video frame rate should be encoded at approximately 66 ms, is encoded some time earlier. Despite the actual encoding time, frame #2 is stamped with a PTS of 66 ms. Frame #3, which according to the specified video frame rate should be encoded at approximately 100 ms, is encoded some time earlier and time stamped with a PTS of 100 ms. Frame #4, which according to the specified video frame rate should be encoded at approximately 133 ms, is stamped with a PTS of 133 ms. Frame #5, which according to the specified video frame rate should be encoded at approximately 166 ms, is encoded at an SCR time of 133 ms and stamped with a PTS of 166 ms. In other words, frame #5 should have been encoded at approximately an SCR time of 166 ms because the specified frame rate indicates that the fifth video frame should be encoded at that time. Frame 45, however, is actually encoded at an SCR time of 133 ms (i.e., a full frame time earlier than it should have been encoded). Despite the actual time, frame #5 is stamped with a PTS of 166 ms (i.e., an inaccurate time stamp).

The situation described above may produce problems in decoding the actual video frames. When the video frames are produced at a rate which is faster than that specified, the decoder's 150 input buffer may be completely filled. The decoder 150 may then discard a number of frames to catch up which may cause the display to appear discontinuous. Moreover, if any of the discarded frames are reference frames, decoding subsequent frames may be delayed which may cause additional display artifacts.

FIG. 3 shows the time stamps associates with video frames when the video frames are provided at a frame rate which is slower than the specified rate. SCR times 33 ms through 200 ms represent the time stamps normally associated with video frames provided at the specified rate. PTS times 33 ms through 166 ms represent the time stamps associated with encoded video frames. Frame #1 though frame #5 represent the actual encoding time for the corresponding frame. If the video frames are provided less frequently than the specified rate, the decoder 150 may experience difficulty in decoding the actual video frames. For example, frame #1 is encoded at approximately SCR time 33 ms and stamped with a PTS of 33 ms. Frame #2 is encoded some time after SCR time 66 ms yet stamped with a PTS of 66 ms. Because of the difference between the actual frame rate and the specified frame rate, as time passes the actual frames arriving increasingly later than the theoretical time. For example, frame #5 is encoded at approximately SCR time 200 ms, the frame is stamped with a PTS of 166 ms. The PTS is for frame #5 is therefore inaccurate.

The inaccurate PTS, may cause difficulty for the decoder 150. For example, the decoder 150 may discard frame #4 because the PTS of 133 ms indicates that the time for displaying frame #4 has passed in relation to SCR time. In other words, frame #4 is stamped with a PTS which indicates that the time for displaying frame #4 has passed. Consequently, the decoder 150 may discard frame #4 and resort to displaying frame #3. When frame #5 is decoded, the PTS of 166 ms indicates that frame #5 is too late as well and may be discarded. Again the decoder 150 may resort to displaying frame #3. This type of behavior may result in detectable visual artifacts such as repeating and skipping subsequent video frames.

SUMMARY OF THE INVENTION

In view of the above discussion, it is an object of the present invention to reduce visual artifacts in the decoded video when video and audio data are supplied in real time.

It is another object of the present invention to reduce the cost of a system for encoding and decoding. audio and video.

It is yet another object of the present invention to produce an output which may be decoded by a standard decoder.

These and other objects of the present invention are provided by determining a time stamp which compensates for a difference between a video frame rate corresponding to a video frame within the real time multimedia data stream and the oscillator clock. The video frame is stamped with a compensating time stamp which compensates for the difference between the theoretical presentation time stamp corresponding to the video frame and the oscillator clock.

The compensating time stamp may be generated by comparing the oscillator clock to the theoretical PTS. If the difference exceeds a first predetermined threshold value the compensation may take place in a coarse adjustment mode. If the difference is less than or equal to a second predetermined threshold the compensation may be made using a fine adjustment mode. Once the compensation is determined, the video frame may then be time stamped with the adjusted PTS.

Fine adjustment may be accomplished by multiplying the theoretical presentation time stamp by a first compensation factor and multiplying the oscillator clock by a second compensation factor. The two products may then be added to provide the adjusted PTS.

Coarse adjustment may be accomplished by incrementing the theoretical PTS and comparing the incremented value with the present value of the oscillator clock. If the comparison indicates that the difference exceeds a third predetermined threshold value, time is added or subtracted to/from the theoretical PTS. Alternatively, a coarse mode adjustment may be made by adjusting the oscillator clock so as to be equal to the value of the closest in time increment of the theoretical PTS.

Consumer electronic devices may provide video and audio data at a rate which does not correspond to the rate specified in a header associated with the multimedia data stream. The decoder may expect video frames to be delivered at the specified rate, yet the actual video rate may vary. This may result in unpleasant visual artifacts in the decoded video. Visual artifacts may be lessened by reducing the number of encoded video frames that may be discarded by the decoder. The MPEG standard allows for certain frames to be encoded with reference to other encoded frames. This means that some frames may be decoded by using previously decoded frames. If, however, the previous video frames are discarded by the decoder the video frames may appear distorted or may be skipped. The present invention may reduce the number of frames that may be discarded by adjusting the PTS so that fewer video frames are time stamped such that the video frames are discarded by the decoder.

System cost may be reduced by reducing the need for special interface hardware to compensate for the inaccurate frame rates produced by some consumer electronic devices. The present invention may address the inaccuracy by providing an adjusted PTS which is less dependent upon the actual frame rate of the video from the consumer electronic device.

A standard encoded output may be provided by complying with the required encoding (i.e., MPEG 1 or MPEG 2). The present invention may provide a multimedia data stream which complies with the encoding standard and, therefore, may allow the system to utilize a decoder which complies with the encoding standard. For example, the system may employ an encoder which utilizes the present invention and a decoder which complies with the MPEG1 or MPEG2 encoding standard. Consequently, the decoder may not be required to understand how the encoder provides the multimedia data stream.

As will further be appreciated by those of skill in the art, the present invention may be embodied as a methods, apparatus/systems or computer program products.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As will be appreciated by one of skill in the art, the present invention may be embodied as methods or devices. Accordingly, the present invention may take the form of an entirely hardware embodiment, an entirely software embodiment or an embodiment combining software and hardware aspects.

The present invention is also described with respect to FIGS. 7 through 10 which are flowchart illustrations of embodiments of the present invention. It will be understood that each block of the flowchart illustrations, and combinations of blocks in the flowchart illustrations, can be implemented by computer program instructions. These program instructions may be provided to a processor to produce a machine, such that the instructions which execute on the processor create means for implementing the functions specified in the flowchart block or blocks. The computer program instructions may be executed by a processor to cause a series of operational steps to be performed by the processor to produce a computer implemented process such that the instructions which execute on the processor provide steps for implementing the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based systems which perform the specified functions or steps, or combinations of special purpose hardware and computer instructions.

Figure 4:
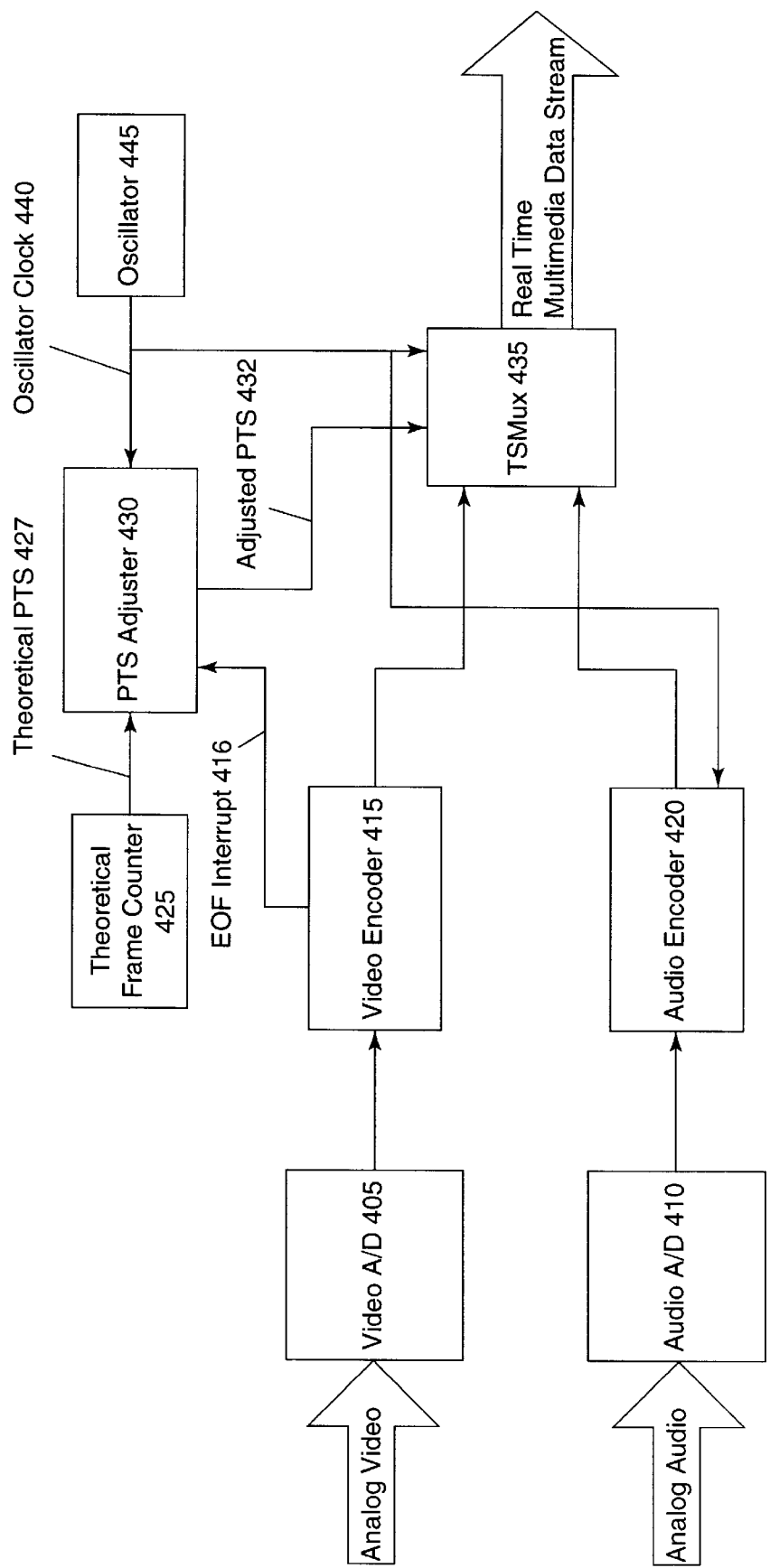
FIG. 4 is a block diagram of a real time multimedia system using encoding and decoding utilizing the present invention.

FIG. 4 is a block diagram of a realtime multimedia system utilizing the present invention. Realtime analog video data is presented to the video analog-to-digital converter 405. The video analog-to-digital converter 405 converts the realtime analog video data to a digitized bit stream. The video encoder 415 converts the digitized video bit stream to an encoded video data stream in compliance with the MPEG standard. The theoretical frame counter 425 uses the specified frame rate to determine the theoretical presentation time stamp (PTS) 427. For example, a specified frame rate of 30 frames per second (fps) correspond to intervals of 33 ms between each frame. The theoretical PTS 427 indicates the theoretical times at which particular video frames supplied at the specified frame rate should be encoded. For example, at 30 fps, frame #1 would theoretically be encoded at approximately 33 ms, frame #2 would be encoded at approximately 66 ms, frame #3 would be encoded at approximately 100 ms, and frame #4 would be encoded at approximately 133 ms.

Video encoder 415 provides an end-of-field (EOF) interrupt 416 to the PTS adjuster 430. The EOF interrupt 416 indicates that the video encoder 415 has detected a complete frame of video from the video analog-to-digital converter 405. The oscillator 445 generates an oscillator clock 440. The oscillator clock 440 indicates the elapsed time since the start of the multimedia data stream. The PTS adjuster 430 examines the difference between the theoretical PTS 427 and the oscillator clock 440. The difference indicates whether the video frames are being provided faster or slower than the specified rate. The PTS adjuster 430 uses these two indications to generate an adjusted PTS 432 which may compensate for the difference. For example, if the specified frame rate is such that a video frame should be produced approximately every 33 ms and the first theoretical PTS occurs at approximately 100 ms, the second theoretical PTS will occur at approximately 133 ms. Similarly, the third theoretical PTS will occur at approximately 166 ms. Consequently, if the oscillator clock is equal to 140 ms during the second video frame, the adjusted PTS will be equal to 133 ms.

The TS Mux 435 multiplexes encoded video data from the video encoder 415 and encoded audio data from the audio encoder 420 into a realtime multimedia data stream. The realtime multimedia data stream also contains presentation time stamps which indicate the PTS for each corresponding frame of encoded video data and audio data. The PTS corresponding to encoded video data is generated from the adjusted PTS 432. The encoded audio data is time stamped according to the oscillator clock 440. The time stamping may enable the decoder to synchronize the presentation of audio and video data to the user.

The PTS adjuster 430 will now be described in greater detail. The PTS adjuster 430 creates an adjusted PTS 432 by determining the difference between the theoretical PTS 427 and the oscillator clock 440. The adjusted PTS 432 is then used to time stamp the corresponding video data within the encoded video data stream. The PTS adjuster 430 first determines whether the difference between the theoretical presentation time stamp 427 and the oscillator clock 440 requires a coarse adjustment or a fine adjustment. This may be done by comparing the difference to a first predetermined threshold value. If the difference exceeds the predetermined threshold, a coarse adjustment mode is selected. In one embodiment, the predetermined threshold may be about one frame time at the specified rate. For example, at 30 fps, one frame time would be approximately 33 ms. A coarse adjustment may be required in such a case because a difference of more than one frame time may produce a visible artifact more quickly than a difference of less than one frame time. Consequently, a coarse mode is used to compensate more quickly. If the required adjustment is less than or equal to the predetermined threshold value a fine adjustment mode is selected.

A fine mode adjustment may be accomplished by first adjusting the theoretical presentation time 427, adjusting the oscillator clock 440, and then adding the adjusted theoretical presentation time and the adjusted oscillator clock time to one another. The adjustment to the theoretical presentation time 427 may be accomplished by multiplying the theoretical presentation time 427 by a first compensation factor. In the preferred embodiment the first compensation factor may be equal to 0.9. However, a first compensation factor of from about 0.5 to about 1.0 may be used. The adjustment to the oscillator clock may be accomplished by multiplying the oscillator time by a second compensation factor. In the preferred embodiment the second compensation factor may be equal to 0.1. However, a second compensation factor of from about 0.0 to about 0.5 may be used. Then, as described above, the two products are added together to generate the fine adjustment to the adjusted PTS 432.

A coarse adjustment mode may be accomplished by incrementing the theoretical PTS 427 and subtracting the incremented theoretical PTS 427 from the oscillator clock 440. The difference between the incremented theoretical PTS 427 and the oscillator clock 440 is truncated so as to preserve any integer component. For example, if the difference between the incremented theoretical PTS 427 and the oscillator clock 440 equals 1.5 frame times, the integer component (i.e., 1) is added to the Theoretical PTS 427. Similarly, if the difference between the incremented theoretical PTS 427 and the oscillator clock 440 equals −1.5 frame times, the integer component (i.e., 1) is subtracted from the Theoretical PTS 427.

In another embodiment, a coarse adjustment may also be provided by rounding the oscillator clock to the nearest theoretical PTS to produce the adjusted PTS 432. The TS Mux 435 then time stamps the encoded video data with the adjusted PTS 432 and time stamps the encoded audio data with the oscillator clock 440.

These methods may occasionally produce two frames with the same PTS. This may compensate for differences between the video frame rate and the oscillator and may be more acceptable than discarding the second frame. The second frame may maintain buffer fullness which may improve system performance by minimizing the disruption of the decoder's predictive decompression.

Figure 5:
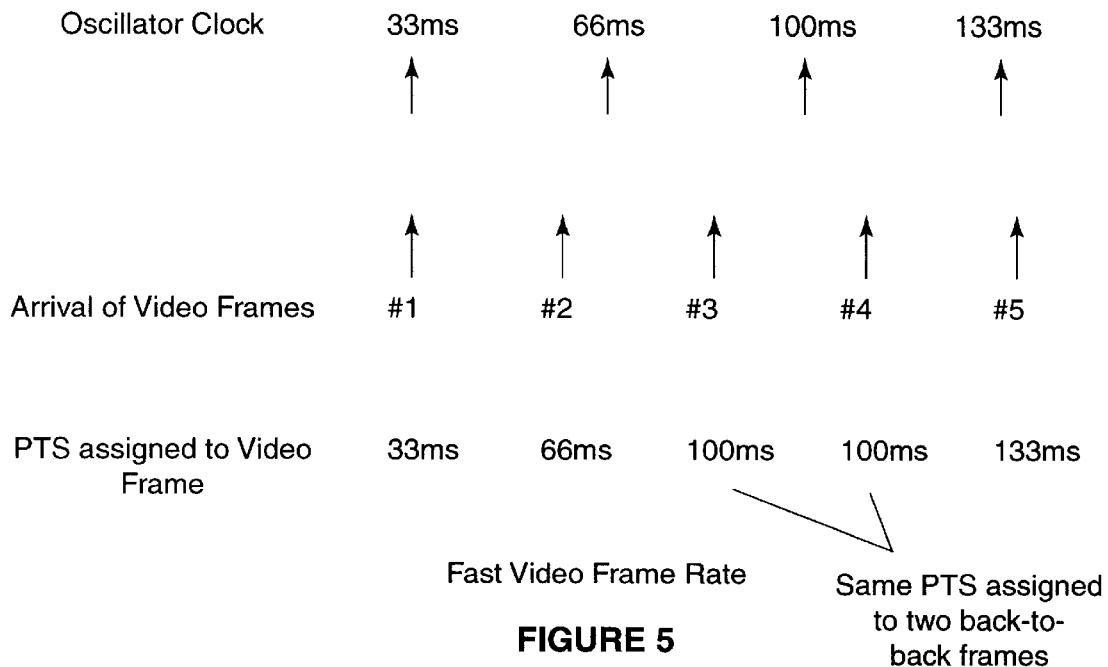
FIG. 5 illustrates the decoding of encoded video frames utilizing the present invention which are presented at a rate which is faster than the specified rate.

FIG. 5 illustrates the decoding of encoded video frames utilizing the present invention which are presented faster than the specified rate. Oscillator clock times 33 ms through 133 ms represent times at which time stamps are inserted into the realtime multimedia data stream. Video frames #1 through #5 represent encoded video frames provided faster than the specified frame rate. PTS times 33 ms to 133 ms represent the Adjusted PTS 432 stamped on the corresponding video frame. A system utilizing the present invention may avoid the problems associated with existing systems by adjusting the time indicated by the oscillator clock so as to be equal to the value of the closest in time increment of the theoretical PTS 427. For example, frame #3 is encoded sometime after oscillator clock time 6 ms. According to the present invention, frame #3 is assigned a PTS of 100 ms. Frame #4 is encoded sometime after oscillator clock time 100 ms and is assigned a PTS of 100 ms. In other words, frames #3 and #4 are assigned the same PTS. Consequently, frame #5 may be assigned a PTS of 133 ms which synchronizes frame #5 to the theoretical PTS for frame #5.

Figure 1A:
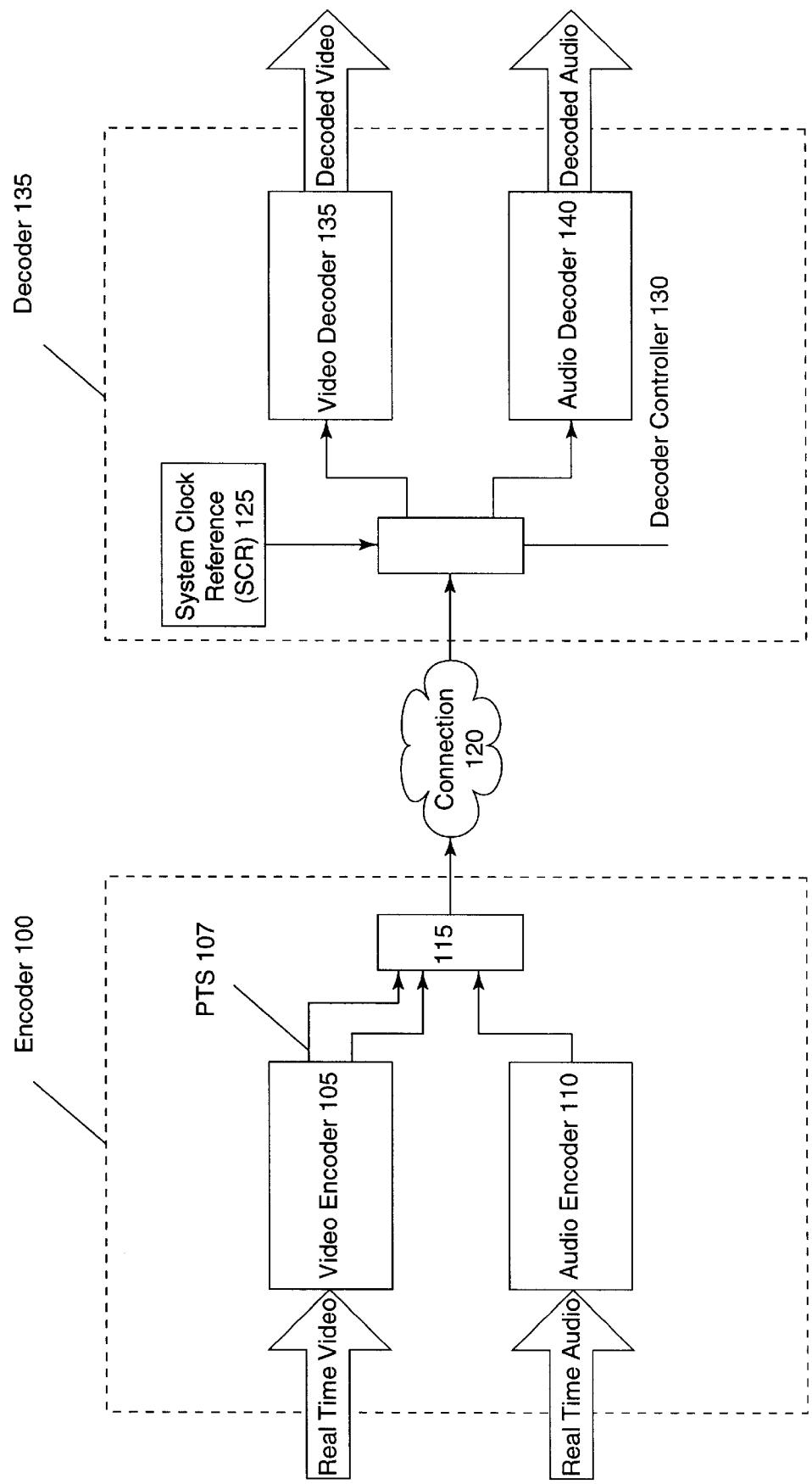
FIG. 1A is a block diagram of a real time multimedia system using encoding and decoding.
Figure 1B:
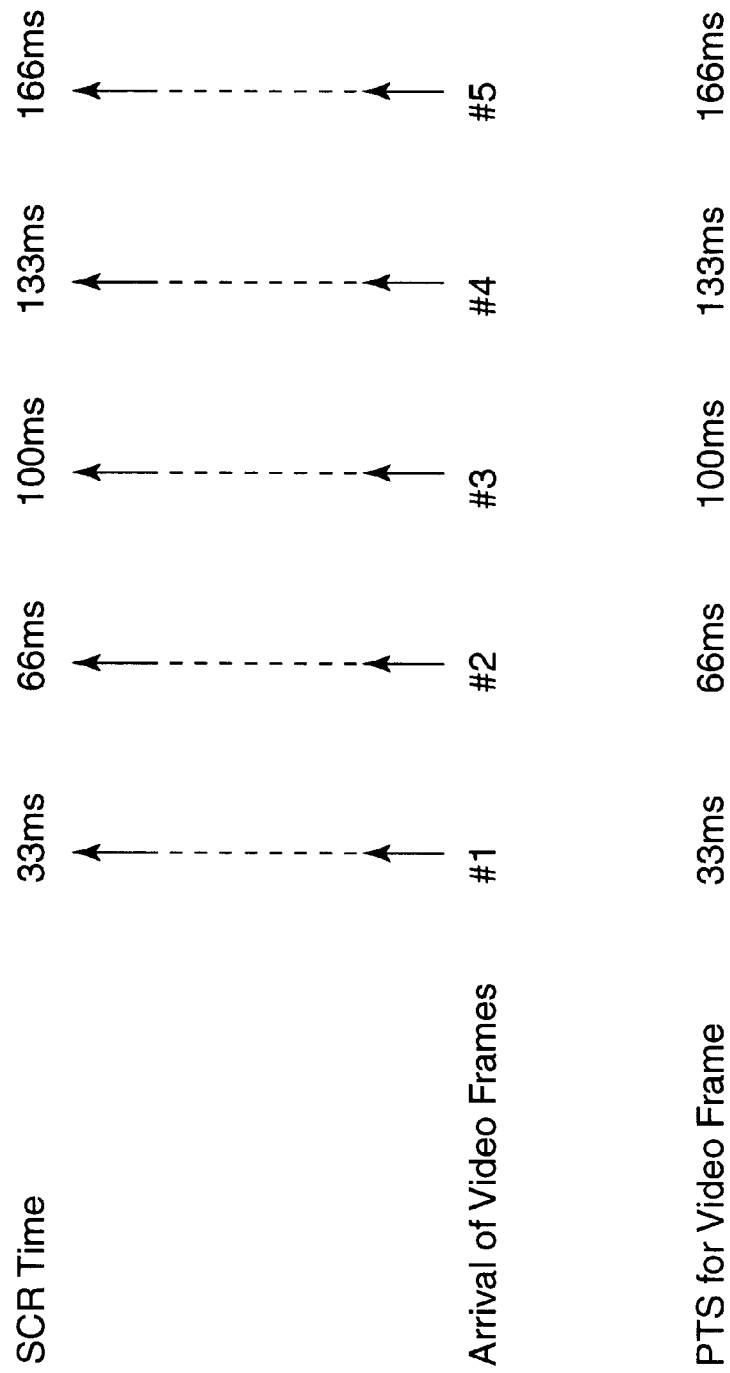
FIG. 1B illustrates the timing of an exemplary encoding and decoding process.
Figure 2:
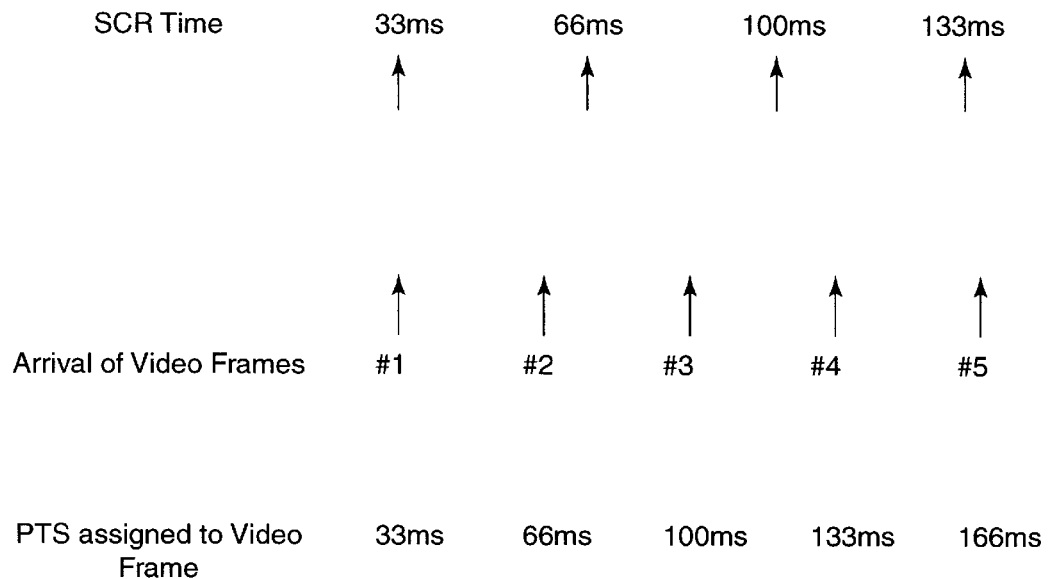
FIG. 2 illustrates the timing of decoding of encoded video frames presented at a rate which is faster than the rate specified by a header.

The present invention, therefore, may avoid the problem found in existing systems shown in FIG. 2. Rather than allowing the decoder's 150 input buffer to fill, the decoder 150 may discard some frames which are stamped with redundant PTS times on arrival. This way, the present invention reduces the likelihood that the decoder's 150 input will fill up.

Figure 3:
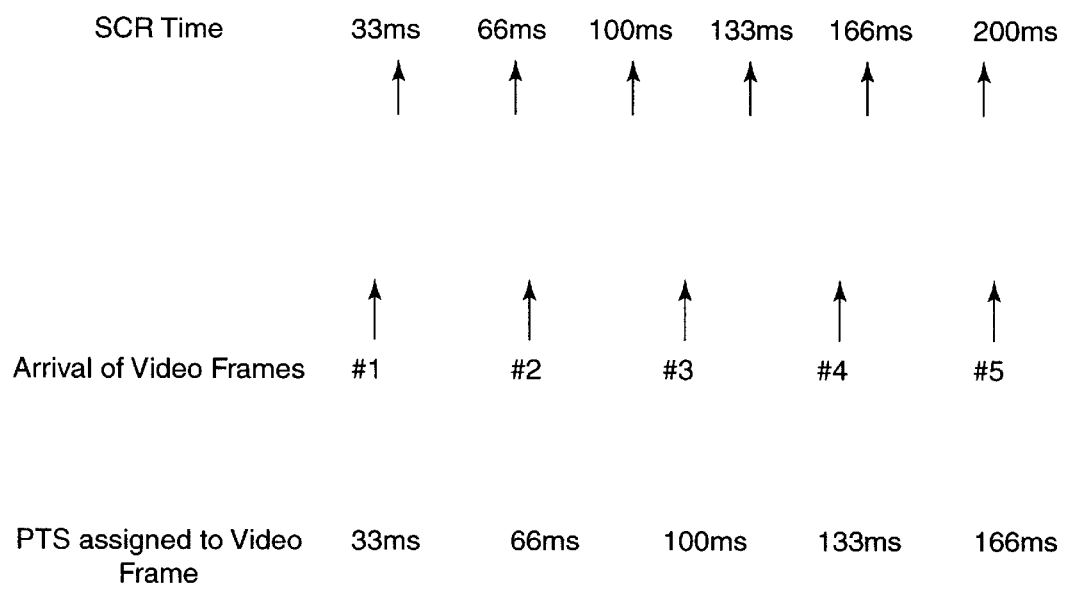
FIG. 3 illustrates the timing of decoding of encoded video frames presented at a rate which is slower than the rate specified by a header.
Figure 6:
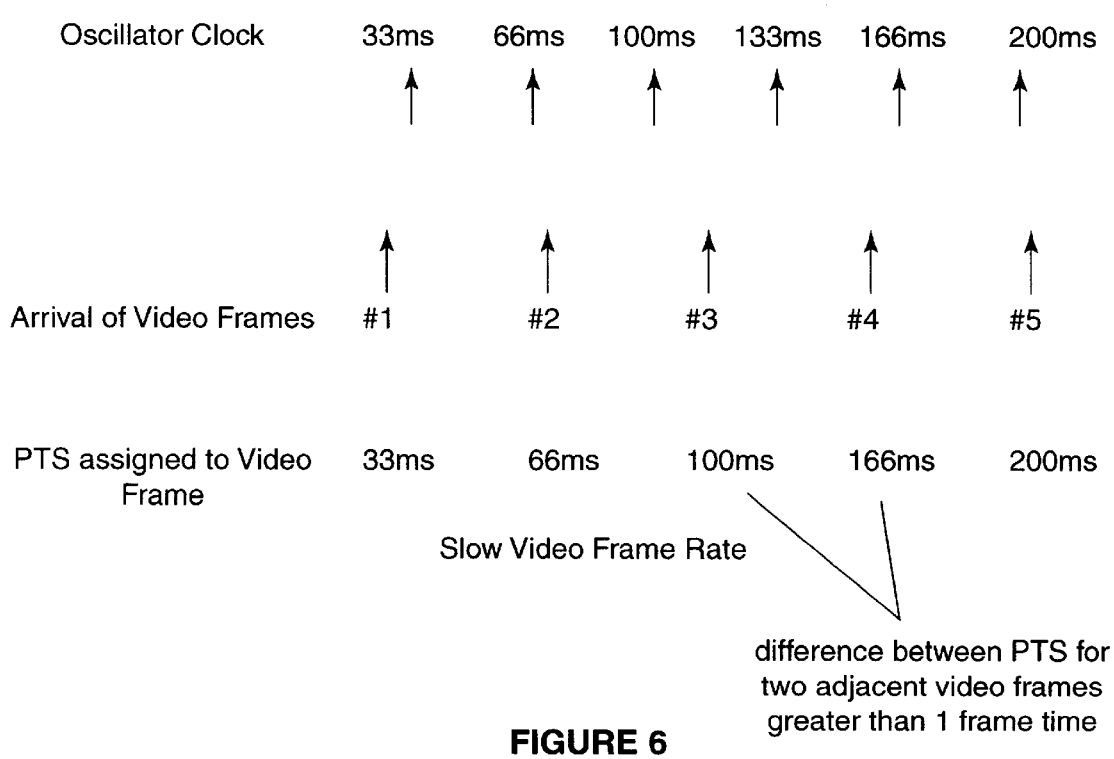
FIG. 6 illustrates the decoding of encoded video frames utilizing the present invention which are presented at a rate which is slower than the specified rate.

FIG. 6 illustrates the decoding of encoded video frames utilizing the present invention which are presented slower than the specified rate. Oscillator clock times 33 ms through 200 ms represent times at which time stamps are inserted into the realtime multimedia data stream. Video frames #1 through #5 represent encoded video frames provided slower than the specified frame rate. PTS times 33 ms to 133 ms represent the Adjusted PTS 432 stamped on the corresponding video frame. A system utilizing the present invention may avoid the problems associated with existing systems by adjusting the time indicated by the oscillator clock so as to be equal to the value of the closest in time increment of the theoretical PTS 427. The present invention therefore reduces the problem described with reference to FIG. 3. For example, in FIG. 3, the decoder may exhibit a skip and repeat behavior because the actual video frames would arrive with time stamps which are outdated. FIG. 6, however, illustrates that the slow frames will be time stamped according to the nearest oscillator clock time. For example, frame #3 may be stamped with a PTS of 100 ms while frame #4 may be stamped with a PTS of 166 ms (i.e., frames #3 and #4 are stamped with PTS values more than one frame time apart). Consequently, frame #5 may be stamped with a PTS of 200 ms which is synchronized to the theoretical PTS for frame #5.

Figure 7:
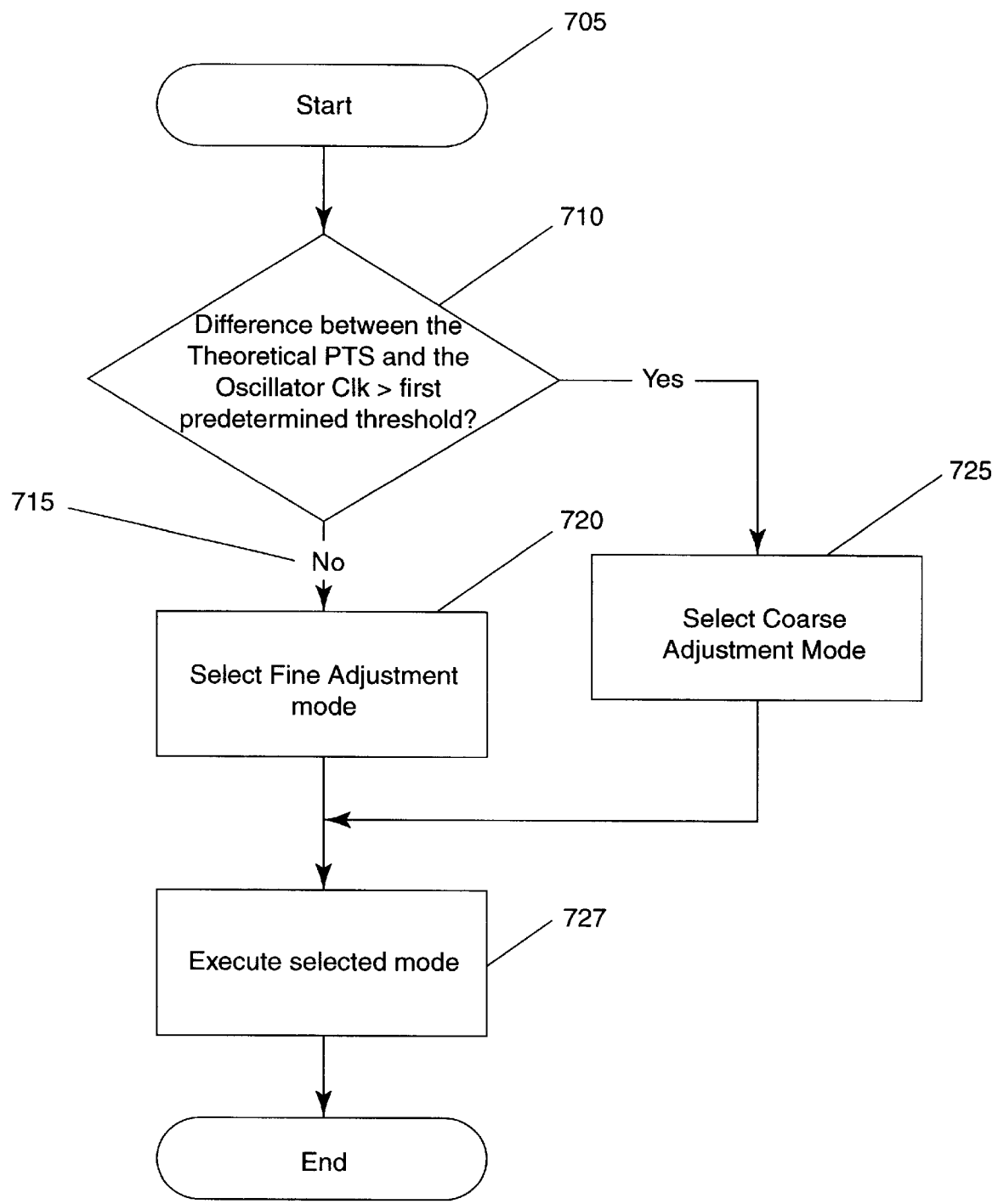
FIG. 7 is a flow chart of the operation of one embodiment of the present invention.

FIG. 7 is a flowchart of the operation of one embodiment of the present invention. Processing begins in step 705. The difference between the theoretical presentation time stamp and the oscillator clock is examined (block 710). If the difference between the theoretical presentation time stamp and the oscillator clock exceeds a first predetermined threshold value, then a coarse adjustment mode is selected (block 725). In the preferred embodiment, the first predetermined threshold may be about 1 frame time. If, however, the difference between the theoretical presentation time stamp and the oscillator clock is less than the first predetermined threshold, a fine adjustment mode is selected (block 720). The selected adjustment mode is then executed (block 727) and processing ends for this frame.

Figure 8:
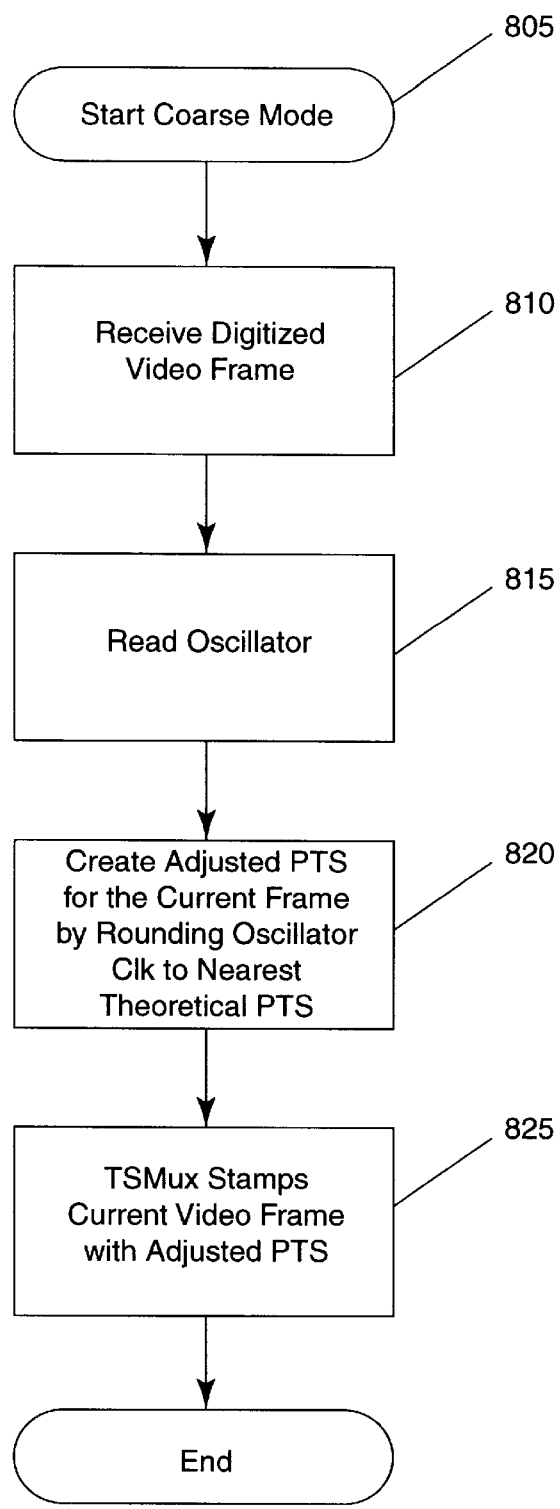
FIG. 8 is a flow chart of the operation of an alternative embodiment of the present invention.

FIG. 8 is a flowchart of an embodiment of the present invention according to the coarse adjustment mode. Coarse mode adjustment mode starts in block 805. A digitized video frame is received (block 810). The oscillator clock is then read (block 815) and an adjusted PTS is created for the current time stamp by rounding the oscillator clock to the nearest theoretical PTS (block 820). The TS Mux then stamps the current video frame with the adjusted PTS (block 825).

Figure 9:
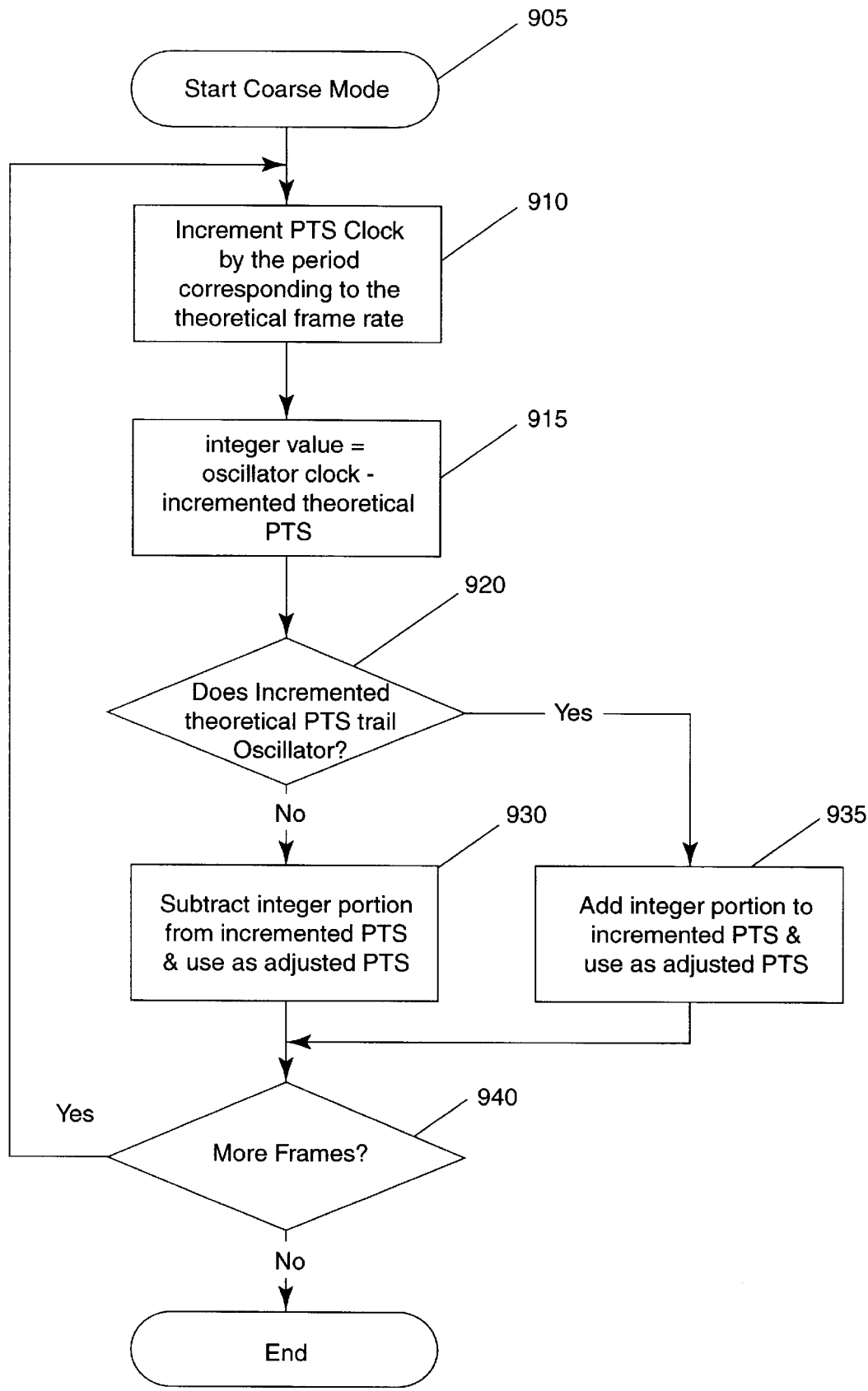
FIG. 9 is a flow chart of the operation of another embodiment of the present invention.

FIG. 9 illustrates an embodiment utilizing the present invention according to an alternative coarse adjustment mode. Coarse adjustment mode begins at block 905. First, the theoretical PTS is incremented by the period corresponding to the theoretical frame rate or frame time (block 910). The incremented theoretical PTS is subtracted from the oscillator clock (block 915) providing a difference comprised of an integer and a fraction. If the difference is negative, the incremented theoretical PTS leads the oscillator clock (block 920) and the integer portion of the difference is subtracted from the incremented theoretical PTS to provide the adjusted PTS (block 930). If the difference is positive, the incremented theoretical PTS lags the oscillator clock (block 920) and the integer portion of the difference is added to incremented theoretical PTS to provide the adjusted PTS (block 935). A determination is then made as to whether more frames require processing (block 940). If more frames do require processing, processing returns to block 910. If no frames require processing, processing ends.

Figure 10:
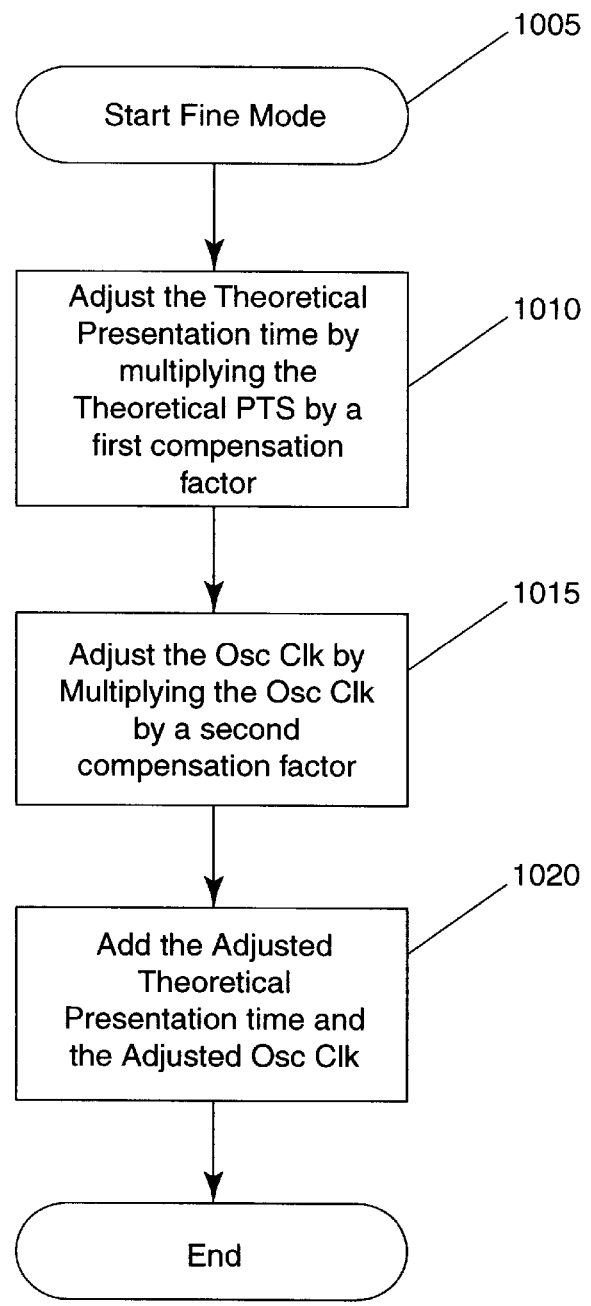
FIG. 10 is a flow chart of the operation of another alternative embodiment of the present invention.

FIG. 10 is a flowchart of the operation of another embodiment of the present invention. Specifically, FIG. 10 is an embodiment of a fine mode adjustment utilizing the present invention. The fine mode adjustment starts at block 1005. The theoretical presentation time is adjusted by multiplying the theoretical presentation time by a first predetermined compensation factor (block 1010). The oscillator clock is then adjusted by multiplying the oscillator clock by a second predetermined compensation factor.1 (block 1015). The adjusted theoretical presentation time and the adjusted oscillator clock are then added (block 1020) to provide an adjusted theoretical presentation time for use as the time stamp for the current video frame.

Although the present invention is described with reference to the MPEG1 and MPEG2 standards, it should be understood that the present invention may also be practiced in systems which implement other techniques for encoding and decoding video and audio data.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed is:

1. A method of generating an encoded real time multimedia data stream comprising the steps of:
    determining a time stamp which compensates for a difference between a video frame rate corresponding to a video frame within the real time multimedia data stream and an oscillator clock; and
    stamping the video frame with the time stamp which compensates for the difference between the theoretical presentation time stamp corresponding to the video frame and the oscillator clock, wherein said steps of determining a time stamp and stamping the video frame comprises the steps of:
    comparing the oscillator clock to a theoretical presentation time stamp;
    selectively adjusting the oscillator clock so as to provide an adjusted presentation time stamp based upon the theoretical time stamp and the oscillator clock; and
    stamping the video frame within the real time multimedia data stream with the adjusted presentation time stamp.

2. The method of claim 1, wherein said step of selectively adjusting the oscillator clock so as to provide an adjusted presentation time stamp comprises the steps of:
    determining the difference between the theoretical presentation time stamp and the oscillator clock;
    selecting a coarse adjustment mode if the difference between the theoretical presentation time stamp and the oscillator clock is more than a first predetermined threshold value;
    selecting a fine adjustment mode if the difference between the theoretical presentation time stamp and the oscillator clock is less than or equal the first predetermined threshold value; and
    adjusting the presentation time stamp in accordance with the selected mode.

3. The method of claim 2, wherein said step of selecting a coarse adjustment mode comprises the step of adjusting the time indicated by the oscillator clock so as to be equal to the value of the closest in time increment of the theoretical presentation time stamp.

4. The method of claim 2, wherein said step of selecting a coarse adjustment mode comprises the steps of:
    incrementing the theoretical presentation time stamp;
    comparing the incremented theoretical presentation time stamp with the oscillator clock; and
    adjusting the incremented theoretical presentation time stamp.

5. The method of claim 4, wherein said step of comparing comprises subtracting the incremented theoretical presentation time stamp from the oscillator clock to provide an integer value.

6. The method of claim 5, wherein said step of adjusting the incremented theoretical presentation time stamp comprises the steps of:
    adding the integer value to the incremented theoretical presentation time stamp if the subtraction results in a positive integer; and
    subtracting the integer value from the incremented theoretical presentation time stamp if the subtraction results in a negative integer.

7. The method of claim 2, wherein said step of selecting a fine adjustment mode comprises the steps of:
    adjusting the theoretical presentation time stamp;
    adjusting the oscillator clock time; and
    adding the adjusted theoretical presentation time stamp and the adjusted oscillator clock time.

8. The method of claim 7, wherein said step of adjusting the theoretical stamp comprises the step of multiplying the theoretical presentation time stamp by a first compensation factor.

9. The method of claim 8, wherein the first compensation factor equals about 0.9.

10. The method of claim 7, wherein said step of adjusting the oscillator clock time comprises the step of multiplying the oscillator clock time by a second compensation factor.

11. The method of claim 7, wherein the second compensation factor is about 0.1.

12. The method of claim 2, wherein the first predetermined threshold value is about equal to one frame time of the specified frame rate.

13. A system for generating an encoded real time multimedia data stream comprising:

means for determining a time stamp which compensates for a difference between a video frame rate corresponding to a video frame within the real time multimedia data stream and an oscillator clock; and means for stamping the video frame with the time stamp which compensates for the difference between the video frame rate corresponding to the video frame and the oscillator clock, wherein said means for determining a time stamp and stamping the video frame comprises:

means for comparing the oscillator clock to a theoretical presentation time stamp;

means for selectively adjusting the oscillator clock so as to provide an adjusted presentation time stamp based upon the theoretical time stamp and the oscillator clock; and means for stamping the video frame within the real time multimedia data stream with the adjusted presentation time stamp.

14. The system according to claim 13, wherein said means for selectively adjusting the oscillator clock so as to provide an adjusted presentation time stamp comprises:

means for determining the difference between the theoretical presentation time stamp and the oscillator clock;

means for selecting a coarse adjustment mode if the difference between the theoretical presentation time stamp and the oscillator clock is more than a first predetermined threshold value; and means for selecting a fine adjustment mode if the difference between the theoretical presentation time stamp and the oscillator clock is less than or equal to the first predetermined threshold value.

15. The sys)tem of claim 14, wherein the first predetermined threshold value is about equal to one frame time of the specified frame rate.

16. The system according to claim 14, wherein said means for selecting a coarse adjustment mode comprises means for adjusting the time indicated by the oscillator clock so as to be equal to the value of the closest in time increment of the theoretical presentation time stamp.

17. The system according to claim 14, wherein said means for selecting a coarse adjustment mode comprises:

means for incrementing the theoretical presentation time stamp;

means for comparing the incremented theoretical presentation time stamp with the oscillator clock; and means for adjusting the incremented theoretical presentation time stamp.

18. The system of claim 17, wherein said means for comparing comprises means for subtracting the incremented theoretical presentation time stamp from the oscillator clock to provide an integer value.

19. The system according to claim 17, wherein said means for adjusting the incremented theoretical presentation time stamp comprises:

means for adding the integer value to the incremented theoretical presentation time stamp if the subtraction results in a positive integer; and means for subtracting the integer value from the incremented theoretical presentation time stamp if the subtraction results in a negative integer; increasing the value of the incremented theoretical presentation time stamp.

20. The system according to claim 14, wherein said means for selecting a fine adjustment mode comprises means for:

means for adjusting the theoretical presentation time stamp;

means for adjusting the oscillator clock time; and means for adding the adjusted theoretical presentation time stamp and the adjusted oscillator clock time.

21. The system according to claim 20, wherein said means for adjusting the theoretical presentation time stamp comprises means for multiplying the theoretical presentation time stamp by a first compensation factor.

22. The system according to claim 21, wherein the first compensation factor equals about 0.9.

23. The system according to claim 20, wherein said means for adjusting the oscillator clock time comprises means for multiplying the oscillator clock time by a second compensation factor.

24. The system according to claim 23, wherein the second compensation factor is about 0.1.

25. A computer program product for generating an encoded real time multimedia data stream comprising:

a computer-readable storage medium having computer-readable program code means embodied in said medium, said computer-readable program code means comprising:

computer readable program code means for determining a time stamp which compensates for a difference between a video frame rate corresponding to a video frame within the real time multimedia data stream and an oscillator clock; and computer readable program code means for stamping the video frame with the time stamp which compensates for the difference between the video frame rate corresponding to the video frame and the oscillator clock, wherein computer readable program code means for determining a time stamp and stamping the video frame comprises:

computer readable program code means for comparing the oscillator clock to a theoretical presentation time stamp;

computer readable program code means for selectively adjusting the oscillator clock so as to provide an adjusted presentation time stamp based upon the theoretical time stamp and the oscillator clock; and computer readable program code means for stamping the video frame within the real time multimedia data stream with the adjusted presentation time stamp.

26. The method of claim 25, wherein said computer readable program code means for adjusting the oscillator clock so as to provide an adjusted presentation time stamp comprises:

computer readable program code means for determining the difference between the theoretical presentation time stamp and the oscillator clock;

computer readable program code means for selecting a coarse adjustment mode if the difference between the theoretical presentation time stamp and the oscillator clock is more than a first predetermined threshold value;

computer readable program code means for selecting a fine adjustment mode if the difference between the theoretical presentation time stamp and the oscillator clock is less than or equal to the first predetermined threshold value; and computer readable program code means for adjusting the presentation time stamp in accordance with the selected mode.

27. The computer program product according to claim 26, wherein the first predetermined threshold value is about equal to one frame time of the specified frame rate.

28. The computer program product according to claim 26, wherein said computer readable program code means for selecting a coarse adjustment mode comprises the step of adjusting the time indicated by the oscillator clock so as to be equal to the value of the closest in time increment of the theoretical presentation time stamp.

29. The computer program product according to claim 26, wherein said computer readable program code means for selecting a coarse adjustment mode comprises:

computer readable program code means for incrementing the theoretical presentation time stamp;

computer readable program code means for comparing the incremented theoretical presentation time stamp with the oscillator clock; and computer readable program code means for adjusting the incremented theoretical presentation time stamp.

30. The computer program product according to claim 29, wherein said computer readable program code means for comparing comprises means for subtracting the incremented theoretical presentation time stamp from the oscillator clock to provide an integer value.

31. The method of claim 30, wherein said computer readable program code means for selecting a fine adjustment mode comprises:

computer readable program code means for adjusting the theoretical presentation time stamp;

computer readable program code means for adjusting the oscillator clock time; and computer readable program code means for adding the adjusted theoretical presentation time stamp and the adjusted oscillator clock time.

32. The computer program product according to claim 31, wherein said computer readable program code means for selecting a fine adjustment mode comprises:

computer readable program code means for adjusting the theoretical presentation time stamp;

computer readable program code means for adjusting the oscillator clock time; and computer readable program code means for adding the adjusted theoretical presentation time stamp and the adjusted oscillator clock time.

33. The computer program product according to claim 32, wherein said computer readable program code means for adjusting the theoretical presentation time stamp comprises the step of multiplying the theoretical presentation time stamp by a first compensation factor.

34. The computer program product according to claim 33, wherein the first compensation factor is equal to about 0.9.

35. The computer program product according to claim 32, wherein said computer readable program code means for adjusting the oscillator clock time comprises the step of multiplying the oscillator clock time by a second compensation factor.

36. The computer program product according to claim 35, wherein the second compensation factor is equal to about 0.1.

37. A system for generating a real time multimedia data stream with accurate time stamps for decoding comprising:

an first analog to digital converter that converts analog video frames to digitized video frames for encoding;

a second analog to digital converter that converts analog audio data to digitized audio data for encoding;

a video encoder for encoding the digitized video frames and providing an end of frame interrupt;

an audio encoder for encoding digitized audio;

a presentation time stamp counter for determining the theoretical present time stamp;

an oscillator for clocking the encoded audio data, the audio analog to digital converter and providing a system clock;

a presentation time stamp adjustor for providing an adjusted presentation time stamp which compensates for a difference between the theoretical frame rate corresponding to a video frame within the real time multimedia data stream and the oscillator clock;

a presentation time stamp multiplexer for time stamping the encoded audio data with the oscillator and stamping the encoded video data with the adjusted presentation time stamp.

* * * * *